No. 832,992. PATENTED OCT. 9, 1906.
H. MORGAN.
BEVERAGE SPOON.
APPLICATION FILED DEC. 16, 1905.
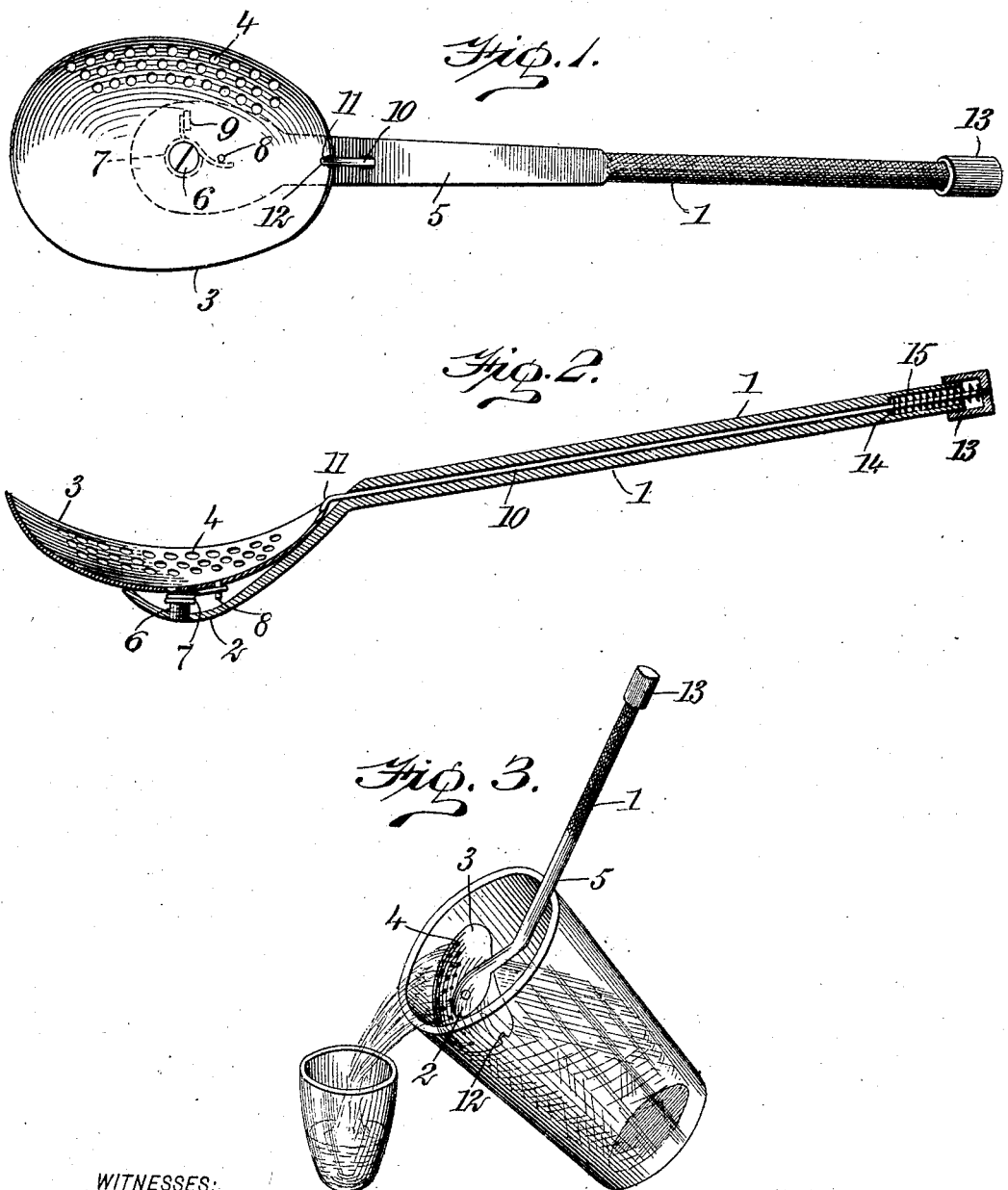
WITNESSES:
INVENTOR
Henry Morgan
BY
ATTORNEYS

UNITED STATES PATENT OFFICE.

HENRY MORGAN, OF CRIPPLE CREEK, COLORADO, ASSIGNOR OF ONE-HALF TO CHARLES FISHER, OF CRIPPLE CREEK, COLORADO.

BEVERAGE-SPOON.

No. 832,992.  Specification of Letters Patent.  Patented Oct. 9, 1906.

Application filed December 16, 1905. Serial No. 292,058.

*To all whom it may concern:*

Be it known that I, HENRY MORGAN, a citizen of the United States, and a resident of Cripple Creek, in the county of Teller and State of Colorado, have invented a new and Improved Beverage-Spoon, of which the following is a full, clear, and exact description.

This invention relates to improvements in spoons for mixing and straining beverages such as are usually dispensed in restaurants, bar-rooms, and the like, the object being to provide a spoon of simple construction that may be quickly and readily changed from mixing to straining position, thus saving considerable time in the mixing and straining of drinks.

I will describe a beverage-spoon embodying my invention and then point out the novel features in the appended claims.

Reference is to be had to the accompanying drawings, forming a part of this specification, in which similar characters of reference indcate corresponding parts in all the figures.

Figure 1 is a plan of a beverage-spoon embodying my invention. Fig. 2 is a longitudinal section thereof, and Fig. 3 is a perspective view showing the device as in use for straining.

The spoon comprises a tubular end 1, having a cup-shaped end 2, in which the bowl 3 of the spoon is supported.

The spoon-bowl is substantially of ovate form, so that when in straining position it will fit closely in the glass in which the beverage is mixed, and at one side the bowl is provided with straining-perforations 4.

For a portion of its length, near the bowl, the handle is flattened on the upper side, as indicated at 5, so as to rest firmly on the edge of a glass when straining the liquid and the upper portion of the handle may be corrugated, as indicated, to afford a firm hold.

The bowl 3 is mounted to rotate on a stud 6 arranged in the cup-shaped end 2, and when released, as will be hereinafter described, a one-quarter turn is imparted to the bowl by means of a spring 7, which is coiled around the stud and has one end engaging with a pin 8 on the bowl and the other end with a lug 9, arranged in the cup-shaped portion.

Arranged through the tubular end 1 is a locking-rod 10, which at its lower end extends outward through the handle and is turned downward, as indicated at 11, to engage in a notch 12, formed in the spoon-bowl at one end—as here shown, at the smaller end.

At its upper or outer end the rod 10 connects with a cap 13, slidable on the end of the handle, and between this cap 13 and a shoulder 14, formed in the spoon-handle, is a coiled spring 15.

In the operation when the parts are in the position indicated in Figs. 1 and 2 the device is used for mixing the liquid in the mixing-glass. When it is desired to strain the liquid from the ice or other material that may be in the glass, the mixer, by placing his finger on the cap 13 and pressing the same inward, will move the end 11 of the rod 10 out of the notch 12, thus permitting the spring 7 to rotate the bowl to straining position, as indicated in Fig. 3.

Having thus described my invention, I claim as new and desire to secure by Letters Patent—

1. A beverage-spoon comprising a handle, a bowl having rotary connection therewith, means for locking the bowl in open position with relation to the handle, and a spring for imparting a rotary movement to the bowl upon being released.

2. A beverage-spoon comprising a tubular handle having a cup-shaped end, a stud arranged in said cup-shaped end, a bowl mounted to rotate on said stud, the said bowl being provided with perforations near one side, a spring-pressed rod movable in the tubular handle and having a portion for locking engagement with the bowl, and a spring for imparting a rotary movement to the bowl when released.

3. A beverage-spoon comprising a tubular handle, a perforated bowl having rotary connection therewith, a spring for imparting a rotary movement to said bowl, the said bowl having a notch in its edge, and a spring-pressed rod in the handle for engaging in said notch.

4. A spoon for the purpose described, comprising a handle having a flattened portion at its upper side, a perforated bowl having rotary connection with the handle, a spring for causing a rotary movement of the bowl, and a locking connection between the bowl and handle.

5. A spoon for the purpose described, comprising a tubular handle, a perforated bowl having rotary connection with the handle, the said bowl being provided with a notch in its edge, a rod extended through the tubular end and having a portion for engaging in said notch, a cap in the outer end of said rod, the said cap being movable on the end, and a spring connection between the handle and cap.

In testimony whereof I have signed my name to this specification in the presence of two subscribing witnesses.

HENRY MORGAN.

Witnesses:
  A. S. BREWSTER,
  F. M. MILES.